June 4, 1935.  E. SABALLUS  2,003,556

GAUGE FOR FUEL PUMP ROCKER ARMS

Filed Oct. 2, 1933  2 Sheets-Sheet 1

INVENTOR.
Erwin Saballus

SANDBO 1558,294  33-180 A
FORSLUND 1566,083  "
GIAMPAOLI 1772,829  116-124

June 4, 1935.　　　　E. SABALLUS　　　　2,003,556
GAUGE FOR FUEL PUMP ROCKER ARMS
Filed Oct. 2, 1933　　　2 Sheets-Sheet 2

INVENTOR.
Erwin Saballus

UNITED STATES PATENT OFFICE 2,003,556

GAUGE FOR FUEL PUMP ROCKER ARMS

Erwin Saballus, Chicago, Ill., assignor to Joseph Weidenhoff, Inc., Chicago, Ill., a corporation of Illinois Application October 2, 1933, Serial No. 691,782

2 Claims. (Cl. 33—180)

An object of this invention is to provide a means for readily checking the position of the rocker arm of one or more models of fuel pumps when the fuel pump has been disassembled from the engine.

This and other objects, as will hereinafter appear, are accomplished by this invention which is fully described in the following specification and shown in the accompanying drawings, in which—

The embodiment illustrated comprises a gauge having a base member I preferably of about the size and shape of the flange ordinarily used on fuel pumps of this type. This base member has a flat member 2 secured thereto and upstanding therefrom preferably at an angle of 90° from the base member. On the opposite side of the base member are two lugs 4, 4, adapted to snugly fit into holes in the flange of the fuel pump, which is shown in dotted lines in Fig. 3, after it has been disassembled from its position on the automobile engine.

Figure 3:
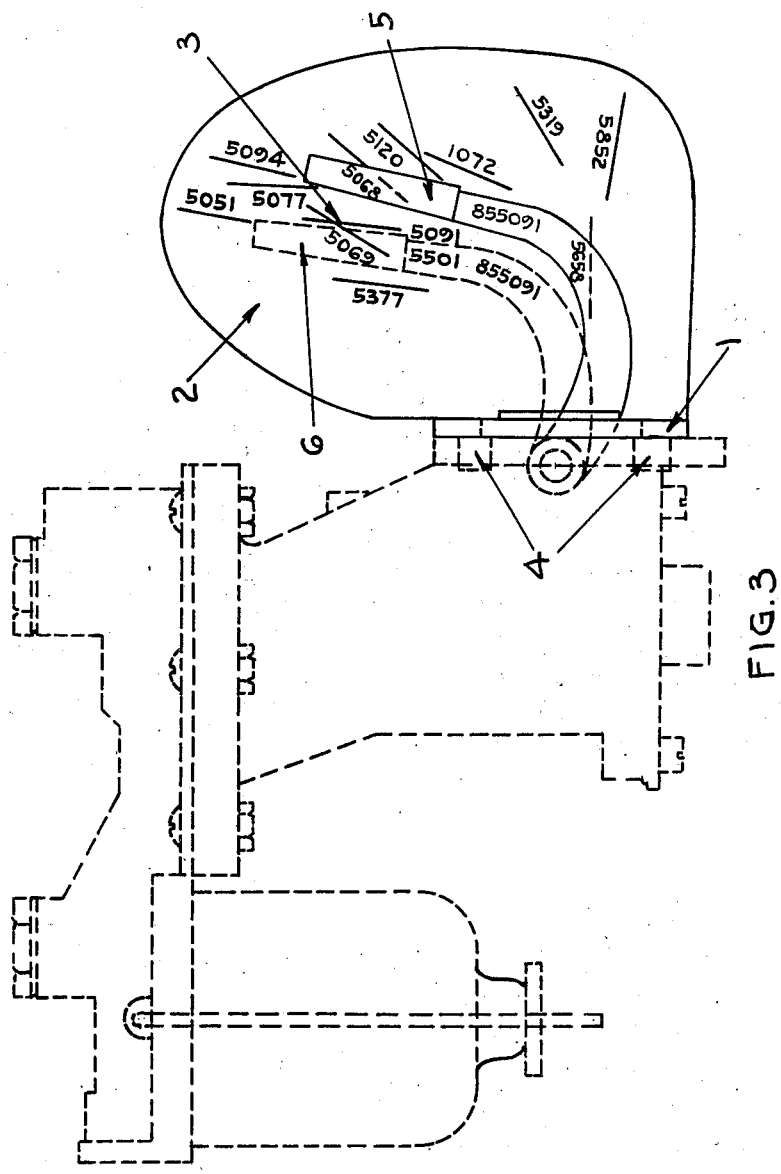
Fig. 3 is a side elevation of a fuel pump removed from the engine with the gauge applied thereto in checking position.

Each fuel pump has a rocker arm at 5, shown in full lines in Fig. 3, which lies alongside of the front face of the flat member which carries a number of straight line marks, each of which has a number or other indication corresponding to a particular make and model of fuel pump. To use this device the operator disassembles the fuel pump from the automobile and applies the gauge to the flange of the pump, as indicated in Fig. 3. While thus holding the parts in assembled relation he presses the rocker arm from the inoperative position 5 to the starting point of the pump action, which position is indicated by the dotted line position 6 of the rocker arm. This position is indicated on the gauge by the mark 3 bearing the numbers 5091 and 5501, so that the gauge shows the pump of Fig. 3 to have its rocker arm correctly set. If, however, the gauge shows that the rocker arm is not in the correct operating position, the arm is bent or otherwise adjusted until its operating face lies alongside its mark and is parallel thereto.

Figure 1:
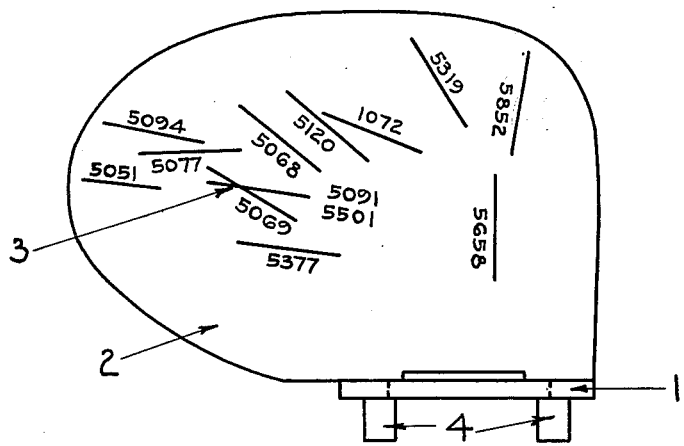
Figure 1 is a side elevation of the gauge.
Figure 2:
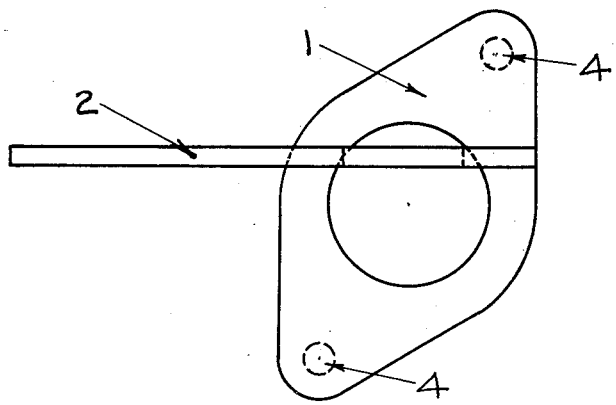
Fig. 2 is a top plan view of the same.

The various other marks shown in Fig. 1 and their indicating numbers correspond to the positions of the rocker arms of various other makes and models of fuel pumps, each pump bearing its own numeral, and the gauge is made with marks having numerals corresponding to those on the various models of fuel pumps. Thus one gauge will serve for setting practically all of the models of fuel pumps sold in any one year. As the models change, however, new gauges will have to be built or new marks and indicating numerals applied to existing gauges.

Thus it will be seen that a very simple and convenient device is provided for locating the correct operating position of the rocker arm of any one of many models of fuel pumps.

While I have shown and described but a single embodiment of my invention, it is to be understood that it is capable of many modifications. Changes, therefore, in the construction and arrangement may be made which do not depart from the spirit and scope of the invention as disclosed in the appended claims.

I claim:

1. A gauge for indicating the location of a rocker arm for an automobile fuel pump comprising a base member having an aperture through which the rocker arm may pass, spaced lugs integral with the base member for positioning said member with respect to a fuel pump flange, and a vertically disposed member on the opposite side of said base member provided with a graduation whereby the position of the rocker arm may be noted.

2. A gauge for indicating the location of a rocker arm for an automobile fuel pump comprising a base member having an aperture through which the rocker arm may pass, means on the base for positioning said member with respect to a fuel pump flange, and a flat member projecting from the base member and adapted to lie alongside the rocker arm and carrying a plurality of marks each corresponding to the position of a rocker arm of a particular model of fuel pump at starting point of pump action, each mark having the identification of its model associated therewith.

ERWIN SABALLUS.